US012783567B2

(12) United States Patent
Toyoshiba

(10) Patent No.: US 12,783,567 B2
(45) Date of Patent: Nov. 3, 2026

(54) INFORMATION SEARCH APPARATUS, INFORMATION SEARCH METHOD, AND INFORMATION SEARCH PROGRAM

(71) Applicant: FRONTEO, Inc., Tokyo (JP)

(72) Inventor: Hiroyoshi Toyoshiba, Tokyo (JP)

(73) Assignee: FRONTEO, Inc., Tokyo (JP)

( * ) Notice: Subject to any disclaimer, the term of this patent is extended or adjusted under 35 U.S.C. 154(b) by 35 days.

(21) Appl. No.: 18/005,381

(22) PCT Filed: Mar. 15, 2021

(86) PCT No.: PCT/JP2021/010292
§ 371 (c)(1),
(2) Date: Jan. 13, 2023

(87) PCT Pub. No.: WO2022/074859
PCT Pub. Date: Apr. 14, 2022

(65) Prior Publication Data

US 2023/0289374 A1 Sep. 14, 2023

(30) Foreign Application Priority Data

Oct. 8, 2020 (JP) ................................ 2020-170213

(51) Int. Cl.
*G06F 16/34* (2025.01)
*G06F 16/334* (2025.01)
*G06F 16/338* (2019.01)

(52) U.S. Cl.
CPC ........ *G06F 16/3347* (2019.01); *G06F 16/338* (2019.01); *G06F 16/34* (2019.01)

(58) Field of Classification Search
CPC ........ G06F 17/00; G06F 16/31; G06F 16/387; G06F 16/35; G06F 16/34
(Continued)

(56) References Cited

U.S. PATENT DOCUMENTS 5,517,234 A * 5/1996 Gerber .................. G06T 7/0006 348/125
6,850,252 B1 * 2/2005 Hoffberg .............. H04N 21/475 380/252
(Continued)

FOREIGN PATENT DOCUMENTS

JP 4540970 B2 9/2010
JP 2012059100 A 3/2012
JP 5159772 B2 3/2013

OTHER PUBLICATIONS

International Search Report and Written Opinion issued on Jun. 15, 2021 for corresponding PCT Application No. PCT/JP2021/010292.

*Primary Examiner* — Tony Mahmoudi
*Assistant Examiner* — Linh Black
(74) *Attorney, Agent, or Firm* — POLSINELLI PC

(57) ABSTRACT

Included is a reference mark display unit 13 that specifies search target feature vectors characterizing arbitrary input search targets or relevant element feature vectors characterizing arbitrary input relevant elements, and displays a predetermined reference mark at a corresponding position on a 2D map based on coordinate information based on the specified feature vectors. By displaying a 2D map in which a reference mark is indicated at a corresponding position specified from arbitrary input information rather than a 2D map in which a plurality of search targets is merely plotted on a 2D plane, it is possible to extract a search target by designating a desired region on the 2D map with reference to a position of the reference mark corresponding to the arbitrary input information.

11 Claims, 7 Drawing Sheets

(58) Field of Classification Search
USPC ................ 707/693, 696, 711, 741, 745, 830, 707/728–729, 17.051, 17.08, 17.083, 707/17.084, 17.058, 17.056, 171, 24, 707/17.124
See application file for complete search history.

(56) References Cited

U.S. PATENT DOCUMENTS 7,167,823 B2 * 1/2007 Endo ........................ G06F 16/58 704/7
7,502,780 B2 * 3/2009 Thorpe ............... G06F 16/3328 707/999.005
8,902,251 B2 * 12/2014 Nielsen .................. G06Q 50/26 345/629
9,206,309 B2 * 12/2015 Appleby ............. B29C 33/3835
10,685,184 B1 * 6/2020 Arfa ........................ G06Q 10/40
10,909,728 B1 * 2/2021 Appalaraju ........... G06T 3/4046
11,361,365 B2 * 6/2022 Greenwald ........ G06Q 30/0631
2002/0183960 A1 * 12/2002 Chiou ................... G01S 5/0294 702/150
2003/0217066 A1 * 11/2003 Kayahara .............. G06F 16/334
2003/0229441 A1 * 12/2003 Pechatnikov ...... G01C 21/3611 701/411
2004/0107194 A1 6/2004 Thorpe
2005/0249426 A1 * 11/2005 Badawy ............... H04N 19/597 382/241
2006/0056695 A1 * 3/2006 Wu ....................... G06T 1/0028 382/173
2006/0155398 A1 * 7/2006 Hoffberg .............. G06V 40/103 700/86
2006/0173614 A1 * 8/2006 Nomura ............. G01C 21/3881 701/425
2007/0055441 A1 * 3/2007 Retterath ........... G01C 21/3647 701/532
2007/0192066 A1 * 8/2007 Ide .......................... G06F 17/18 702/179
2008/0065685 A1 * 3/2008 Frank ....................... G06F 16/29 707/999.102
2008/0146334 A1 * 6/2008 Kil .......................... G06Q 40/08 463/36
2008/0195315 A1 * 8/2008 Hu ....................... G08G 1/0969 701/455
2009/0119583 A1 * 5/2009 Kihara .................... G06F 16/40 715/273
2010/0153356 A1 * 6/2010 Nakamura ............. G06Q 10/10 707/706
2011/0064312 A1 * 3/2011 Janky ...................... G06F 18/00 382/195
2011/0143707 A1 * 6/2011 Darby, Jr. ............. H04W 4/185 455/404.2
2012/0062589 A1 3/2012 Iwayama
2012/0163656 A1 * 6/2012 Wang .................... G01S 19/485 382/103
2013/0002705 A1 * 1/2013 Cornell ................. G06T 11/203 345/617
2013/0072794 A1 * 3/2013 Waki ...................... A61B 8/466 600/438
2013/0073388 A1 * 3/2013 Heath .................... G06Q 50/01 705/14.53
2013/0083011 A1 * 4/2013 Geisner ................... G06F 3/013 345/419
2013/0182909 A1 * 7/2013 Rodriguez-Serrano ...................... G06V 30/19127 382/173
2013/0195340 A1 * 8/2013 Iwase ................... A61B 3/0025 382/131
2013/0325341 A1 * 12/2013 van Os ................ G09B 29/005 701/533
2013/0326380 A1 * 12/2013 Lai ...................... G06F 3/04815 715/765
2013/0326384 A1 * 12/2013 Moore ............... G01C 21/3664 715/771
2013/0326407 A1 * 12/2013 van Os ................... G06T 19/00 715/810
2014/0079297 A1 * 3/2014 Tadayon .............. G06V 40/172 382/118
2014/0267393 A1 * 9/2014 Mitchell ................. G06T 11/60 345/632
2014/0348405 A1 * 11/2014 Chen ...................... A61C 7/002 382/131
2015/0370828 A1 * 12/2015 Maurer ............... G06F 16/2228 707/722
2016/0267397 A1 * 9/2016 Carlsson .................. G06N 3/04
2016/0358312 A1 * 12/2016 Kolb, V ..................... G06T 5/73
2017/0017921 A1 * 1/2017 Reeder ............... G06Q 10/0838
2018/0164434 A1 * 6/2018 Stokes .................. G01S 7/6263
2019/0011534 A1 * 1/2019 Trotta ...................... G01S 13/89
2019/0018904 A1 * 1/2019 Russell ............... G06F 16/9024
2019/0073795 A1 * 3/2019 Matsuzawa ............... G06T 7/80
2019/0279334 A1 * 9/2019 Nagamasa ................ G06T 3/40
2019/0328489 A1 * 10/2019 Capron-Richard .. A61B 6/5247
2019/0347668 A1 * 11/2019 Williams ............ G06F 18/2413
2019/0392082 A1 * 12/2019 Bell ......................... G06N 3/08
2020/0064983 A1 * 2/2020 Higuchi ................. G09G 5/377
2020/0272850 A1 * 8/2020 Sakai ....................... G06F 18/29
2020/0403965 A1 * 12/2020 Jones .................. H04L 61/5007
2021/0073449 A1 * 3/2021 Segev ..................... G06F 30/27
2021/0153976 A1 * 5/2021 Chen ...................... A61C 7/002
2021/0244372 A1 * 8/2021 Inglese .................. A61B 6/032
2021/0279636 A1 * 9/2021 Staar ........................ G06N 3/09
2021/0397662 A1 * 12/2021 Sakakibara ........... G06F 16/906
2021/0406302 A1 * 12/2021 Kumar ..................... G06N 3/02

* cited by examiner

INFORMATION SEARCH APPARATUS, INFORMATION SEARCH METHOD, AND INFORMATION SEARCH PROGRAM

CROSS REFERENCE TO RELATED APPLICATIONS

This application is a National Phase filing under 35 U.S.C. § 371 of PCT/JP2021/010292, filed on Mar. 15, 2021; which application in turn claims priority to Application No. 2020-170213 filed on Japan on Oct. 8, 2020. The entire contents of each application are hereby incorporated by reference.

TECHNICAL FIELD

The present invention relates to an information search apparatus, an information search method, and an information search program, and is particularly suitable for use in information search in which a two-dimensional (2D) map having a plurality of search targets plotted on a 2D plane is displayed, and a search target corresponding to a plot included in a region designated by a user operation is extracted.

BACKGROUND ART

Conventionally, there has been a known technology for displaying a 2D map in which a plurality of search targets is plotted on a 2D plane based on a feature vector generated from a search target, extracting search targets corresponding to plots included in a region designated by a user operation, and displaying a list of the extracted search targets (for example, see Patent Documents 1 and 2).

A document search apparatus described in Patent Document 1 displays a map in which a plurality of documents is plotted on a 2D plane based on a document vector. Then, when a user designates a desired region on a 2D map in which a plot is positioned according to a degree of relevance between documents in this way, query vectors of a plurality of documents included in the designated region are synthesized, a document vector in an information database is compared with a synthetic query vector, and documents corresponding to document vectors close to the synthetic query vector are extracted and displayed in a list.

In the document search apparatus described in Patent Document 1, a 2D map generator reads a document vector corresponding to a document extracted based on a search keyword entered by the user from the information database, and calculates a similarity between respective documents. The 2D map generator reduces the dimension of a multidimensional document vector to obtain a 2D document vector and performs conversion into an x-coordinate and a y-coordinate so that similar documents are placed closer together on the 2D map based on the similarity between the respective document vectors. The 2D map generator creates a coordinate list of the x-coordinate and the y-coordinate of each document, and creates a 2D map based on the coordinate list.

In addition, an information search apparatus described in Patent Document 2 generates and displays a 2D map illustrating respective information items corresponding to respective positions in an array so that similar information items are mapped to close positions based on a similarity of information items from a set of the information items. Further, when the user performs an operation to define an arbitrary boundary region on the 2D map, by specifying an information item which is present as information indicating a position in the defined boundary region and corresponds to a position in the array as an item corresponding to a search query, related search is performed for the boundary region, and a list of information items specified as a result of the related search is displayed.

In the information search apparatus described in Patent Document 2, for example, the information item is a document. The information search apparatus generates a multidimensional feature vector based on an abstract expression representing a frequency of a term used in a document (for example, a term frequency histogram composed by counting the number of times a word in a dictionary appears in an individual document). Then, after reducing the dimension of the feature vector, a semantic map is created by projecting the feature vector onto a 2D self-organizing map. By assigning the feature vector for each document to the map, a map position according to an x-coordinate and a y-coordinate is generated for each document, and a relationship between documents can be visualized according to a position thereof.

CITATION LIST

Patent Document

Patent Document 1: Japanese Patent No. 5,159,772
Patent Document 2: Japanese Patent No. 4,540,970

SUMMARY OF THE INVENTION

Technical Problem

In technologies described in Patent Documents 1 and 2, a 2D map plotted so that similar documents are disposed close to each other is displayed, and a document located within a region designated on the 2D map is extracted. For this reason, it is possible to efficiently extract a plurality of similar documents. However, there is a problem that the plurality of extracted documents may not match search intention of a user. That is, in the conventional technologies, since it is unknown which region on the 2D map needs to be designated to extract the document matching the search intention, when the user designates a region on a trial basis, and an extracted document is different from a target document, it is necessary to double-check the extracted document by designating another region.

The invention is made to solve such a problem, and an object of the invention is to facilitate search intended by a user with regard to information search in which a 2D map having a plurality of search targets plotted thereon is displayed on a 2D plane, and a search target corresponding to a plot included in a region designated by a user operation is extracted.

Solution to Problem

To solve the above-described problem, in the invention, a 2D map in which a plurality of search targets is plotted on a 2D plane is generated based on coordinate information based on a plurality of search target feature vectors characterizing each of the plurality of search targets, the 2D map is displayed on a screen, a feature vector characterizing a search target or a relevant element input as arbitrary information is specified, and a predetermined reference mark is displayed at a corresponding position on the 2D map based on coordinate information based on the specified feature vector. Then, a search target corresponding to a plot included in a region designated by a user operation on the 2D map displayed together with the reference mark on the screen is extracted.

Advantageous Effects of the Invention

According to the invention configured as described above, a 2D map further having a reference mark at a relevant position specified from arbitrary input information rather than a 2D map having only a plurality of search targets plotted on a 2D plane is displayed. A user can designate an arbitrary region in a 2D map in which each plot of a search target is displayed together with a reference mark, thereby extracting a search target corresponding to a plot included in the corresponding region. In this way, the user can designate a desired region on a 2D map to extract a search target with reference to a position of a reference mark corresponding to arbitrary input information, and thus it is possible to facilitate search intended by the user.

MODE FOR CARRYING OUT THE INVENTION

First Embodiment

Figure 1:
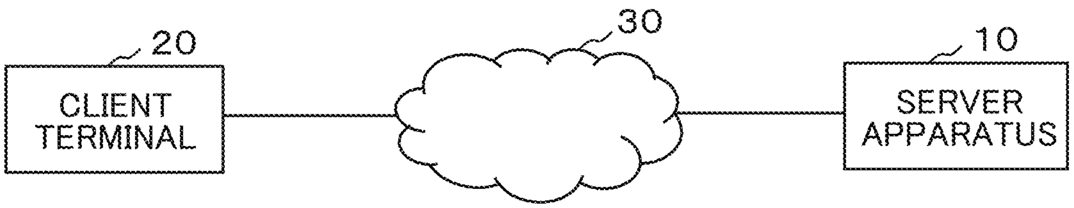
FIG. 1 is a diagram illustrating a configuration example of an information search system including an information search apparatus according to a first embodiment.

Hereinafter, a first embodiment of the invention will be described with reference to the drawings. FIG. 1 is a diagram illustrating an overall configuration example of an information search system including an information search apparatus according to the first embodiment. As illustrated in FIG. 1, the information search system of the present embodiment is configured to include a server apparatus 10 and a client terminal 20, and the server apparatus 10 and the client terminal 20 are connected by a communication network 30 such as the Internet. The server apparatus 10 corresponds to the information search apparatus of the present embodiment.

In the information search system of the present embodiment, when a search keyword is designated from the client terminal 20 and a search is requested to the server apparatus 10, the server apparatus 10 generates a 2D map in which a plurality of search targets associated with the designated search keyword is plotted on a 2D plane, provides the 2D map to the client terminal 20, and displays the 2D map on a screen of the client terminal 20. Then, when an arbitrary region is designated on the 2D map by a user operation on the client terminal 20, the server apparatus 10 extracts a search target corresponding to a plot included in the designated region, provides information related to the extracted search target to the client terminal 20, and displays the information on the screen. As will be described in detail later, in the first embodiment, a predetermined reference mark is displayed at a position on the 2D map corresponding to the designated search keyword. The user can extract a search target by designating a desired region on the 2D map with reference to a position of the reference mark. The client terminal 20 can perform such a process using a web browser, for example.

Figure 2:
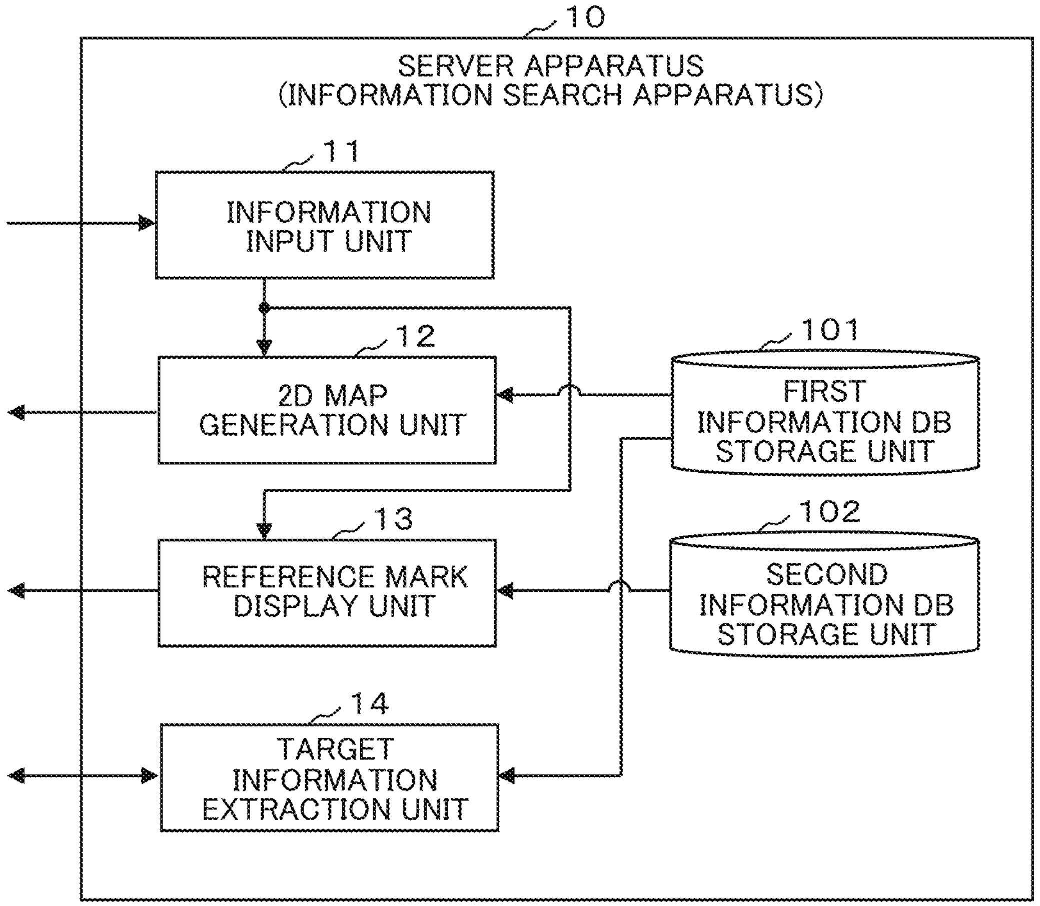
FIG. 2 is a block diagram illustrating a functional configuration example of a server apparatus (information search apparatus) according to the first embodiment.

FIG. 2 is a block diagram illustrating a functional configuration example of the server apparatus 10 (information search apparatus) according to the first embodiment. As illustrated in FIG. 2, the server apparatus 10 of the present embodiment includes an information input unit 11, a 2D map generation unit 12, a reference mark display unit 13, and a target information extraction unit 14 as functional configurations. Further, the server apparatus 10 of the present embodiment includes a first information DB storage unit 101 and a second information DB storage unit 102 as storage media.

Each of the above functional blocks 11 to 14 can be configured by any of hardware, Digital Signal Processor (DSP), and software. For example, in the case of being configured by software, each of the above functional blocks 11 to 14 actually includes a CPU, a RAM, a ROM, etc. of a computer, and is implemented by operating an information search program stored in a recording medium such as a RAM, a ROM, a hard disk, or a semiconductor memory.

Figure 3:
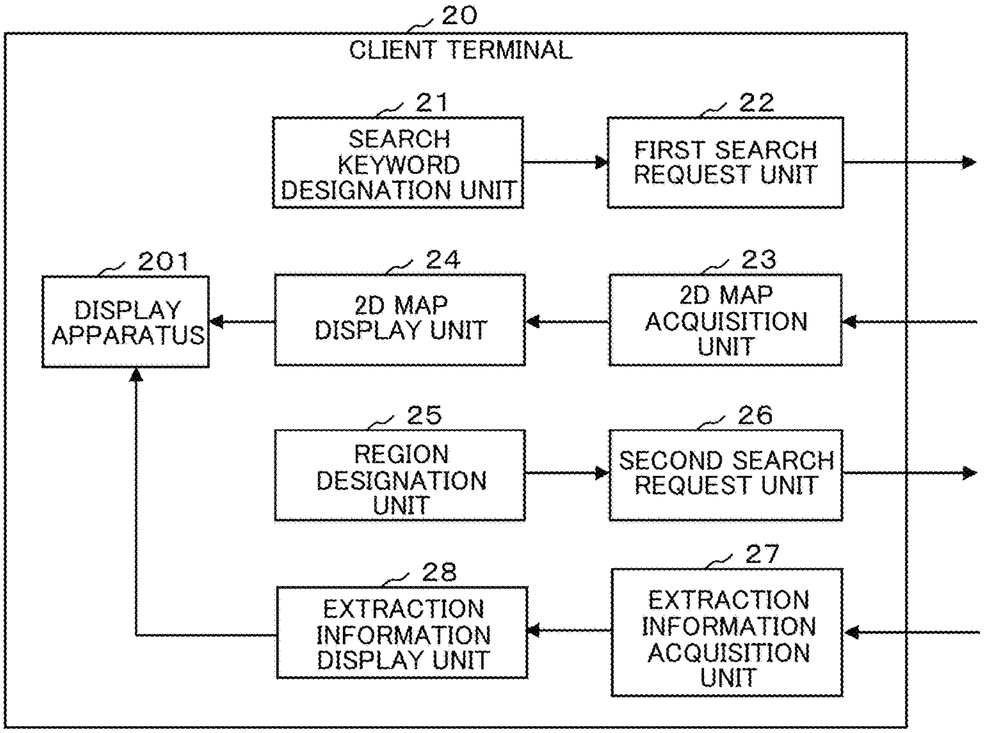
FIG. 3 is a block diagram illustrating a functional configuration example of a client terminal according to the first embodiment.

FIG. 3 is a block diagram illustrating a functional configuration example of the client terminal 20 according to the first embodiment. As illustrated in FIG. 3, the client terminal 20 of the present embodiment includes a search keyword designation unit 21, a first search request unit 22, a 2D map acquisition unit 23, a 2D map display unit 24, a region designation unit 25, a second search request unit 26, an extraction information acquisition unit 27, and an extraction information display unit 28 as functional configurations. Further, the client terminal 20 of the present embodiment includes a display apparatus 201 such as a liquid crystal display or an organic EL display as hardware.

Each of the above functional blocks 21 to 28 can be configured by any of hardware, DSP, and software. For example, in the case of being configured by software, each of the above functional blocks 21 to 28 actually include a CPU, a RAM, a ROM, etc., of a computer, and is implemented by operating a program stored in a recording medium such as a RAM, a ROM, a hard disk, or a semiconductor memory.

The first information DB storage unit 101 of the server apparatus 10 is a nonvolatile storage medium that stores information of a first information database related to a search target. The first information DB storage unit 101 stores a plurality of search targets, a plurality of search target feature vectors, and coordinate information corresponding thereto in association with each other. The search target feature vector is a vector that characterizes the search target, that is, data that represents a feature of the search target (feature that can identify the search target) as a combination of values of a plurality of elements, and the number of elements corresponds to the number of components of the feature vector, that is, the number of dimensions.

In the first embodiment, a search target feature vector is generated in advance using a feature vector computation apparatus (not illustrated), and data of the generated search target feature vector is stored in the first information DB storage unit 101. The search target feature vector can be generated by applying a known technology. However, as an example, it is possible to use the search target feature vector generated by a feature vector computation apparatus illustrated in FIG. 4.

Further, in the first embodiment, 2D coordinate information corresponding to the search target feature vector is generated from the search target feature vector in advance, and the generated coordinate information is stored in the first information DB storage unit 101. The coordinate information can be generated by applying a known technology for performing a dimension compression process on a search target feature vector including elements having three or more dimensions.

The second information DB storage unit 102 is a non-volatile storage medium that stores information of a second information database related to a relevant element associated with the search target. The second information DB storage unit 102 stores a plurality of relevant elements, a plurality of relevant element feature vectors, and coordinate information corresponding thereto in association with each other. The relevant element feature vector is a vector that characterizes the relevant element, that is, data that represents a feature of the relevant element (feature that can identify the relevant element) as a combination of values of a plurality of elements, and the number of elements corresponds to the number of components of the feature vector, that is, the number of dimensions.

In the first embodiment, a relevant element feature vector is generated in advance using the feature vector computation apparatus (not illustrated), and data of the generated relevant element feature vector is stored in the second information DB storage unit 102. The relevant element feature vector can be generated by applying a known technology. However, as an example, it is possible to use the relevant element feature vector generated by the feature vector computation apparatus illustrated in FIG. 4.

Further, in the first embodiment, 2D coordinate information corresponding to the relevant element feature vector is generated from the relevant element feature vector in advance, and the generated coordinate information is stored in the second information DB storage unit 102. The coordinate information can be generated by applying a known technology for performing a dimension compression process on a relevant element feature vector including elements having three or more dimensions.

The search target is information to be plotted on a 2D map, and arbitrary information can be targeted. In the present embodiment, a text is used as the search target. In addition, a word included in the text is used as the relevant element. That is, in the first embodiment, the search target feature vector=text feature vector, and relevant element feature vector=word feature vector.

As an example, the text feature vector is a vector having, as a plurality of elements, index values representing a word to which a text contributes and a degree at which the text contributes to the word, and the word feature vector is a vector having, as a plurality of elements, index values representing a text to which a word contributes and a degree at which the word contributes to the text. The plurality of elements included in the text feature vector is index values related to a plurality of words associated with the text, and is values related to a possibility that a word is included in a certain text when the text appears. The plurality of elements included in the word feature vector is index values related to a plurality of texts associated with the word, and is values related to a possibility that a certain word is included in a text when the word appears.

The text in the present embodiment may include one sentence (a unit separated by a period) (one statement), or include a plurality of sentences. A text including a plurality of sentences may be a part or all of a text contained in one document.

Figure 4:
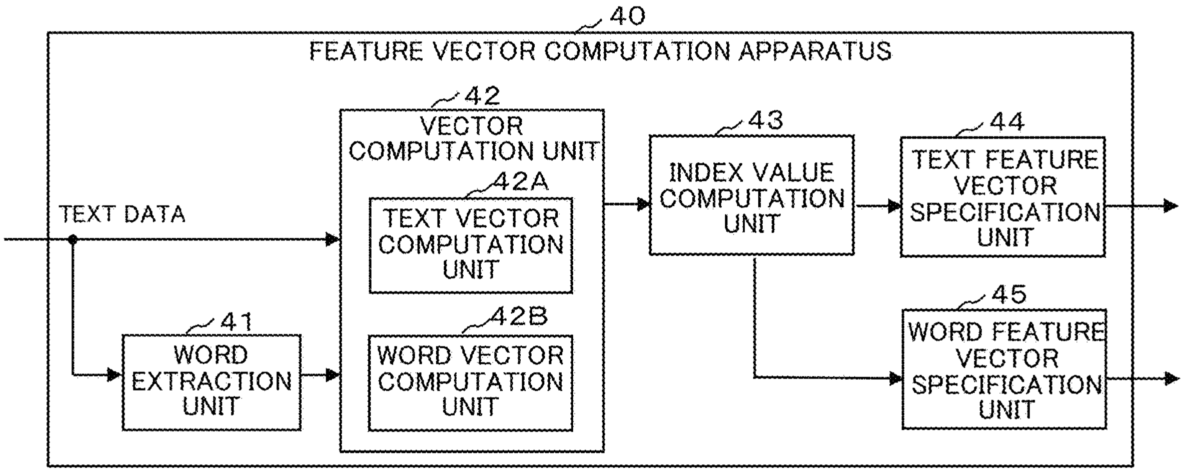
FIG. 4 is a block diagram illustrating a functional configuration example of a feature vector computation apparatus.

Hereinafter, generation method on the text feature vector and the word feature vector will be described with reference to FIG. 4. FIG. 4 is a block diagram illustrating a functional configuration example of the feature vector computation apparatus. The feature vector computation apparatus 40 illustrated in FIG. 4 inputs text data, computes a feature vector that reflects a relationship between a text and a word contained therein, and outputs the computed feature vector. The feature vector computation unit 40 includes a word extraction unit 41, a vector computation unit 42, an index value computation unit 43, a text feature vector specification unit 44, and a word feature vector specification unit 45 as functional configurations thereof. The vector computation unit 42 includes a text vector computation unit 42A and a word vector computation unit 42B as more specific functional configurations.

Each of the functional blocks 41 to 45 can be configured by any of hardware, a DSP, and software. For example, in the case of being configured by software, each of the functional blocks 41 to 45 actually includes a CPU, a RAM, a ROM, etc. of a computer, and is implemented by operation of a program stored in a recording medium such as a RAM, a ROM, a hard disk, or a semiconductor memory.

The word extraction unit 41 analyzes m texts (m is an arbitrary integer of 2 or more) and extracts n words (n is an arbitrary integer of 2 or more) from the m texts. As a method of analyzing texts, for example, a known morphological analysis can be used. Here, the word extraction unit 41 may extract morphemes of all parts of speech divided by the morphological analysis as words, or may extract only morphemes of a specific part of speech as words.

Note that the same word may be included in the m texts a plurality of times. In this case, the word extraction unit 41 does not extract the plurality of the same words, and extracts only one. That is, the n words extracted by the word extraction unit 41 refer to n types of words.

The vector computation unit 42 computes m text vectors and n word vectors from the m texts and the n words. Here, the text vector computation unit 42A converts each of the m texts to be analyzed by the word extraction unit 41 into a q-dimensional vector (q is an arbitrary integer of 2 or more) according to a predetermined rule, thereby computing the m text vectors including q axis components. In addition, the word vector computation unit 42B converts each of the n words extracted by the word extraction unit 41 into a q-dimensional vector according to a predetermined rule, thereby computing the n word vectors including q axis components.

In the present embodiment, as an example, a text vector and a word vector are computed as follows. Now, a set $S=<d\in D, w\in W>$ including the m texts and the n words is considered. Here, a text vector $d_i\rightarrow$ and a word vector $w_j\rightarrow$ (hereinafter, the symbol "→*" indicates a vector) are associated with each text $d_i$ (i=1, 2, . . . , m) and each word $w_j$ (j=1, 2, . . . , n), respectively. Then, a probability $P(w_j|d_i)$ shown in the following Equation (1) is calculated with respect to an arbitrary word w and an arbitrary text $d_i$.

[Equation 1]

$$P(w_j|d_i)=\frac{\exp\left(\vec{w}_j\cdot\vec{d}_i\right)}{\sum_{k=1}^{n}\exp\left(\vec{w}_k\cdot\vec{d}_i\right)} \tag{1}$$

Note that the probability $P(w_j|d_i)$ is a value that can be computed in accordance with a probability p disclosed in, a follow known document. "'Distributed Representations of Sentences and Documents' by Quoc Le and Tomas Mikolov, Google Inc; Proceedings of the 31st International Conference on Machine Learning Held in Beijing, China on 22-24 Jun. 2014" This known document states that, for example, when there are three words "the", "cat", and "sat", "on" is predicted as a fourth word, and a computation formula of the prediction probability p is described.

The probability p(wt|wt−k, . . . , wt+k) described in the known document is a correct answer probability when another word wt is predicted from a plurality of words wt−k, . . . , wt+k. Meanwhile, the probability $P(w_j|d_i)$ shown in Equation (1) used in the present embodiment represents a correct answer probability that one word $w_j$ of n words is predicted from one text $d_i$ of m texts. Predicting one word w from one text $d_i$ means that, specifically, when a certain text $d_i$ appears, a possibility of including the word w in the text $d_i$ is predicted.

Note that since Equation (1) is symmetrical with respect to $d_i$ and $w_j$, a probability $P(d_i|w_j)$ that one text $d_i$ of m texts is predicted from one word $w_j$ of n words may be calculated. Predicting one text $d_i$ from one word $w_j$ means that, when a certain word $w_j$ appears, a possibility of including the word w in the text $d_i$ is predicted.

In Equation (1), an exponential function value is used, where e is the base and the inner product of the word vector w→ and the text vector d→ is the exponent. Then, a ratio of an exponential function value calculated from a combination of a text $d_i$ and a word $w_j$ to be predicted to the sum of n exponential function values calculated from each combination of the text $d_i$ and n words $w_k$ (k=1, 2, . . . , n) is calculated as a correct answer probability that one word w is expected from one text $d_i$.

Here, the inner product value of the word vector $w_j$→ and the text vector $d_i$→ can be regarded as a scalar value when the word vector $w_j$→ is projected in a direction of the text vector $d_i$→, that is, a component value in the direction of the text vector $d_i$→ included in the word vector $w_j$→, which can be considered to represent a degree at which the word $w_j$ contributes to the text $d_i$. Therefore, obtaining the ratio of the exponential function value calculated for one word W to the sum of the exponential function values calculated for n words $w_k$ (k=1, 2, . . . , n) using the exponential function value calculated using the inner product corresponds to obtaining the correct answer probability that one word w of n words is predicted from one text $d_i$.

Note that here, a calculation example using the exponential function value using the inner product value of the word vector w→ and the text vector d→ as an exponent has been described. However, the exponential function value may not be used. Any calculation formula using the inner product value of the word vector w→ and the text vector d→ may be used. For example, the probability may be obtained from the ratio of the inner product values itself.

Next, the vector computation unit 42 computes the text vector $d_i$→ and the word vector $w_j$→ that maximize a value L of the sum of the probability $P(w_j|d_i)$ computed by Equation (1) for all the set S as shown in the following Equation (2). That is, the text vector computation unit 42A and the word vector computation unit 42B compute the probability P $(w_j|d_i)$ computed by Equation (1) for all combinations of the m texts and the n words, and compute the text vector $d_i$→ and the word vector $w_j$→ that maximize a target variable L using the sum thereof as the target variable L.

[Equation 2]

$$L=\sum_{d\in D}\sum_{w\in W}\#(w,d)p(w|d) \tag{2}$$

Maximizing the total value L of the probability P $(w_j|d_i)$ computed for all the combinations of the m texts and the n words corresponds to maximizing the correct answer probability that a certain word w (j=1, 2, . . . , n) is predicted from a certain text $d_i$ (i=1, 2, . . . , m). That is, the vector computation unit 42 can be considered to compute the text vector $d_i$→ and the word vector $w_j$→ that maximize the correct answer probability.

Here, in the present embodiment, as described above, the vector computation unit 42 converts each of the m texts $d_i$ into a q-dimensional vector to compute the m texts vectors $d_i$→ including the q axis components, and converts each of the n words into a q-dimensional vector to compute the n word vectors $w_j$→ including the q axis components, which corresponds to computing the text vector $d_i$→ and the word vector $w_j$→ that maximize the target variable L by making q axis directions variable.

The index value computation unit 43 takes each of the inner products of the m text vectors $d_i$→ and the n word vectors $w_j$→ computed by the vector computation unit 42, thereby computing m×n index values reflecting the relationship between the m texts $d_i$ and the n words $w_j$. In the present embodiment, as shown in the following Equation (3), the index value computation unit 43 obtains the product of a text matrix D having the respective q axis components ($d_{11}$ to $d_{mq}$) of the m text vectors $d_i$→ as respective elements and a word matrix W having the respective q axis components ($w_{11}$ to $w_{nq}$) of the n word vectors $w_j$→ as respective elements, thereby computing an index value matrix DW having m×n index values as elements. Here, $W^t$ is the transposed matrix of the word matrix.

[Equation 3]

$$D=\begin{pmatrix} d_{11} & d_{12} & \dots & d_{1q} \\ d_{21} & d_{22} & \dots & d_{2q} \\ \vdots & \vdots & \ddots & \vdots \\ d_{m1} & d_{m2} & \dots & d_{mq} \end{pmatrix} W=\begin{pmatrix} w_{11} & w_{12} & \dots & w_{1q} \\ w_{21} & w_{22} & \dots & w_{2q} \\ \vdots & \vdots & \ddots & \vdots \\ w_{m1} & w_{m2} & \dots & w_{mq} \end{pmatrix} DW=D*W^t=\begin{pmatrix} dw_{11} & dw_{12} & \dots & dw_{1n} \\ dw_{21} & dw_{22} & \dots & dw_{2n} \\ \vdots & \vdots & \ddots & \vdots \\ dw_{m1} & dw_{m2} & \dots & dw_{mn} \end{pmatrix} \tag{3}$$

Each element of the index value matrix DW computed in this manner may indicate which word contributes to which text and to what extent and which text contributes to which word and to what extent. For example, an element $dw_{12}$ in the first row and the second column may be a value indicating a degree at which the word $w_2$ contributes to a text $d_1$ and may be a value indicating a degree at which the text $d_1$ contributes to a word $w_2$. In this way, each row of the index value matrix DW can be used to evaluate the similarity of a text, and each column can be used to evaluate the similarity of a word.

Figure 5:
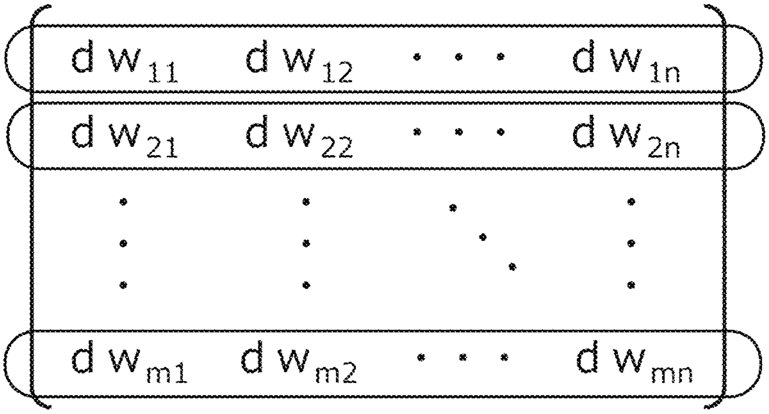
FIG. 5 is a diagram illustrating an example of a text feature vector.

The text feature vector specification unit 44 specifies, as a feature vector, a text index value group including index values of n words for one text for each of m texts. That is, as illustrated in FIG. 5, a text feature vector specification unit 44 specifies a text index value group including index values of n words included in each row of the index value matrix DW as a text feature vector for each of m texts.

Figure 6:
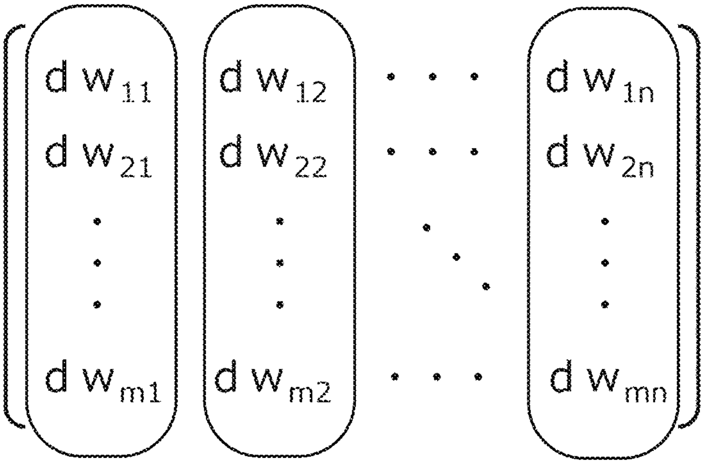
FIG. 6 is a diagram illustrating an example of a word feature vector.

A word feature vector specification unit 45 specifies a word index value group including index values of m texts for one word for each of n words as a word feature vector. That is, as illustrated in FIG. 6, the word feature vector specification unit 45 specifies a word index value group including index values of m texts included in each column of the index value matrix DW as a word feature vector for each of n words.

Here, in the case of q=2, it is possible to use a text feature vector and a word feature vector as 2D coordinate information without change. In this case, it is sufficient to store a plurality of texts and a plurality of text feature vectors (=2D coordinate information) in association with each other in the first information DB storage unit 101. In addition, it is sufficient to store a plurality of words and a plurality of word feature vectors (=2D coordinate information) in association with each other in the second information DB storage unit 102.

Meanwhile, when q is set to a value larger than 3, 2D coordinate information is generated by performing a dimension compression process on each of a text feature vector and a word feature vector. Then, a plurality of texts, a plurality of text feature vectors, and coordinate information corresponding thereto are associated with each other and stored in the first information DB storage unit 101, and a plurality of words, a plurality of word feature vectors, and coordinate information corresponding thereto are associated with each other and stored in the second information DB storage unit 102.

A dimension compression process for the feature vector matrix can be performed using a known process. As a known dimension compression process, for example, principal component analysis (PCA) or singular value decomposition (SVD) can be used. By compressing the dimensions of the feature vector matrix using the PCA or SVD method, it is possible to perform low-rank approximation of the feature vector matrix without damaging a feature of each piece of target information represented by the feature vector matrix as much as possible.

In the functional configurations of the client terminal 20 illustrated in FIG. 3, the search keyword designation unit 21 designates an arbitrary search keyword (an example of a "search key" in the claims) based on a user operation on the client terminal 20. In the first embodiment, an arbitrary word is designated as the search keyword. For example, the user of the client terminal 20 operates a keyboard or a touch panel and inputs a desired word to designate a search keyword.

The first search request unit 22 transmits, to the server apparatus 10, a first search request including a word designated by the search keyword designation unit 21 as a search keyword. The 2D map acquisition unit 23 acquires data of a 2D map (details will be described later) generated by the server apparatus 10 from the server apparatus 10 as a response to the first search request transmitted by the first search request unit 22. The 2D map display unit 24 causes the display apparatus 201 to display the 2D map based on the data of the 2D map acquired by the 2D map acquisition unit 23.

The region designation unit 25 designates an arbitrary region on the 2D map displayed on the display apparatus 201 based on a user operation on the client terminal 20. For example, the user of the client terminal 20 designates a desired region by operating a mouse or a touch panel. A shape and size of the designated region can be arbitrary.

The second search request unit 26 transmits a second search request including information about a region designated by the region designation unit 25 to the server apparatus 10. As a response to the second search request transmitted by the second search request unit 26, the extraction information acquisition unit 27 acquires information related to a search target (text) extracted by the server apparatus 10 (hereinafter, referred to as text-related information) from the server apparatus 10. The extraction information display unit 28 causes the display apparatus 201 to display the text-related information acquired by the extraction information acquisition unit 27.

The text-related information is information extracted from the first information DB storage unit 101, and is, for example, a title of a text. Alternatively, the text-related information may be a text itself stored in the first information DB storage unit 101, or may be hyperlink information for accessing a text stored in the first information DB storage unit 101. Further, when the text is long, a summary may be stored in the first information DB storage unit 101 in association with the text, and the summary may be used as the text-related information. The extraction information display unit 28 causes the display apparatus 201 to display text-related information related to a plurality of texts, for example, in a list format.

In the functional configurations of the server apparatus 10 illustrated in FIG. 2, the information input unit 11 receives the first search request transmitted from the first search request unit 22 of the client terminal 20, and accepts an input of a word (corresponding to arbitrary information related to a relevant element) included in the first search request. That is, in the first embodiment, the information input unit 11 accepts an arbitrary word designated by the client terminal 20 as an input of arbitrary information.

The 2D map generation unit 12 accepts an arbitrary word input by the information input unit 11 as a search keyword, generates a 2D map in which a plurality of search targets (texts) is plotted on a 2D plane based on coordinate information based on a plurality of text feature vectors having a predetermined relationship with the search keyword, and displays the 2D map on a screen of the display apparatus 201 of the client terminal 20.

In the first embodiment, the 2D map generation unit 12 specifies coordinate information based on a plurality of text feature vectors including a word which is a search keyword as an element by referring to the first information database stored in the first information DB storage unit 101 based on an arbitrary word input as the search keyword by the information input unit 11, and generates a 2D map in which a plurality of texts is plotted on a 2D plane based on the specified coordinate information. Plotting the plurality of texts on the 2D plane means drawing points on the 2D plane based on coordinate information corresponding to a text feature vector.

For example, a plurality of text feature vectors including a word which is a search keyword as an element refers to text feature vectors in which an index value related to a word designated as a search keyword is not "0" among a plurality of elements included in the text feature vectors (index values of n words included in each row of the index value matrix DW as illustrated in FIG. 5). For example, when a word designated as a keyword is a word $w_2$, text feature vectors in which a value among index values $dw_{12}, dw_{22}, \ldots, dw_{m2}$ related to the word $w_2$ is not "0" refers to "a plurality of text feature vectors including a word which is a search keyword as an element".

Here, for example, the fact that the index value related to the word $w_2$ is $dw_{12}, dw_{22}, \ldots, dw_{m2}$ can be identified by index information, etc. assigned to a word. That is, by assigning No. 2 index information to the word $w_2$, it is possible to identify that second index values $dw_{12}, dw_{22}, \ldots, dw_{m2}$ of the text feature vector are index values related to the word $w_2$. Alternatively, by specifying a word feature vector $\{dw_{12}, dw_{22}, \ldots, dw_{m2}\}$ corresponding to the word $w_2$ with reference to the second information database stored in the second information DB storage unit 102, it is possible to identify that an index value related to the word $w_2$ is values $dw_{12}, dw_{22}, \ldots, dw_{m2}$.

As described above, the 2D map generation unit 12 specifies a plurality of text feature vectors including a word which is a search keyword as an element by referring to the first information database, and further specifies coordinate information corresponding to the text feature vectors to generate a 2D map in which a plurality of texts is plotted on a 2D plane based on the specified coordinate information. Note that here, a description is given of an example in which a text feature vector in which an index value related to a word designated as a search keyword is not "0" is specified. However, the invention is not limited thereto. For example, it is possible to specify a text feature vector in which an index value is less than or equal to a predetermined number larger than "0".

The reference mark display unit 13 refers to the second information database stored in the second information DB storage unit 102 based on an arbitrary word input as a search keyword by the information input unit 11 to specify coordinate information based on the word feature vector corresponding to the word input as the search keyword, and displays a predetermined reference mark at a corresponding position on the 2D map based on the specified coordinate information.

For example, the reference mark display unit 13 generates data of a reference mark to be synthesized and displayed on a 2D map generated by the 2D map generation unit 12, and transmits the data to the client terminal 20. Note that the example of FIG. 2 illustrates a configuration in which the 2D map generation unit 12 transmits data of the 2D map to the client terminal 20, and the reference mark display unit 13 transmits the data of the reference mark to the client terminal 20. However, the invention is not limited thereto. For example, data obtained by synthesizing a reference mark on a 2D map may be generated, and this synthesized data may be transmitted to the client terminal 20.

Figure 7:
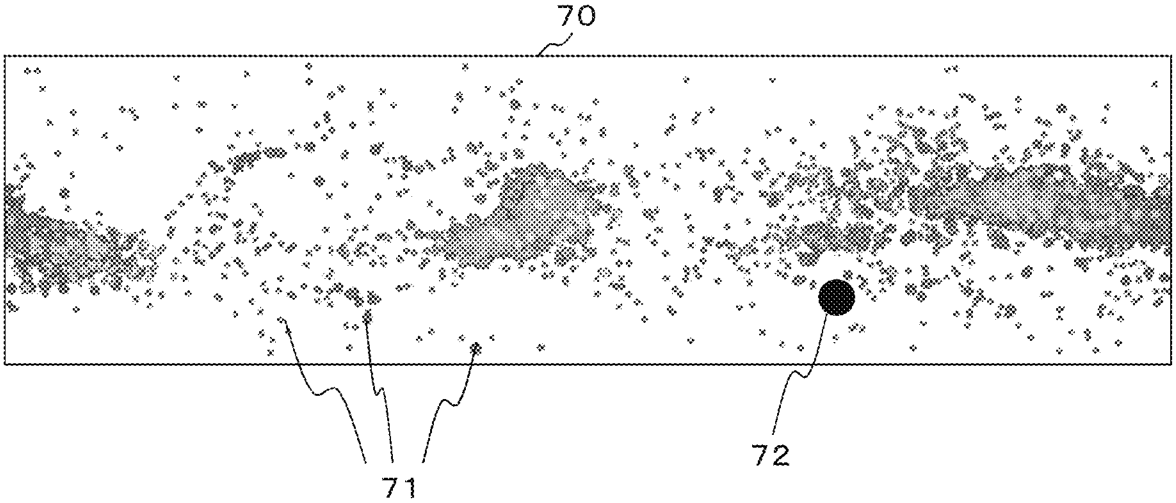
FIG. 7 is a diagram illustrating an example of a 2D map having a reference mark displayed on a client terminal.

FIG. 7 is a diagram illustrating an example of a 2D map having a reference mark displayed on the client terminal 20. As illustrated in FIG. 7, a 2D map 70 in which a plurality of points 71 is plotted at respective positions specified by a plurality of pieces of coordinate information corresponding to a plurality of text feature vectors having a predetermined relationship with respect to a word designated as a search keyword (a plurality of text feature vectors including a word which is a search keyword as an element) is displayed. As illustrated in FIG. 7, in the 2D map 70 generated by the present embodiment, clusters in which plot positions of the plurality of points 71 are in a mass shape are dispersed and exist at a plurality of locations on the 2D plane.

Further, in the present embodiment, the reference mark 72 is displayed at a corresponding position indicated by coordinate information based on a word feature vector corresponding to a word input as a search keyword. The reference mark 72 may be displayed in a manner that can be distinguished from the plurality of points 71 plotted on the 2D map 70. In the example of FIG. 7, a circular mark having a larger diameter than that of the plurality of plotted points 71 is displayed as the reference mark 72.

The position of each point 71 and the position of the reference mark 72 displayed on the 2D map 70 are determined based on the text feature vector and the word feature vector, and reflect a similarity relationship of texts or words. That is, these positions mean that as a distance between the plotted points 71 decreases, a similarity between text feature vectors corresponding thereto increases. On the contrary, these positions mean that as the distance between the plotted points 71 increases, the similarity between the text feature vectors corresponding thereto decreases. For this reason, the 2D map 70 in which texts having a high similarly between text feature vectors are plotted in a mass shape at positions close to each other is generated. Generating the 2D map 70 using a text feature vector having, as elements, a text index value group (values of each row of the index value matrix DW) representing a similarly of a text as an index value representing a word to which a text contributes and a degree at which the text contributes to the word increases a possibility that a cluster is formed between highly related texts.

This description is similarly applied to a relationship based on a distance between the plotted points 71 and the reference mark 72. That is, these positions mean that as the distance between the plotted points 71 and the reference mark 72 decreases, a relationship between a text feature vector and a word feature vector corresponding thereto becomes stronger. On the contrary, as the distance between the plotted points 71 and the reference mark 72 increases, a relationship between a text feature vector and a word feature vector corresponding thereto becomes weaker.

The target information extraction unit 14 extracts a search target corresponding to plots (points 71) included in a region designated by a user operation in the 2D map 70 displayed together with the reference mark 72 on the screen of the display apparatus 201 of the client terminal 20. That is, the target information extraction unit 14 receives a second search request transmitted from the second search request unit 26 of the client terminal 20, and extracts text-related information corresponding to a plot whose coordinate information is included within the designated region from the first information DB storage unit 101 based on information about the designated region included in the second search request. Then, the target information extraction unit 14 transmits the extracted text-related information to the client terminal 20.

Figure 8:
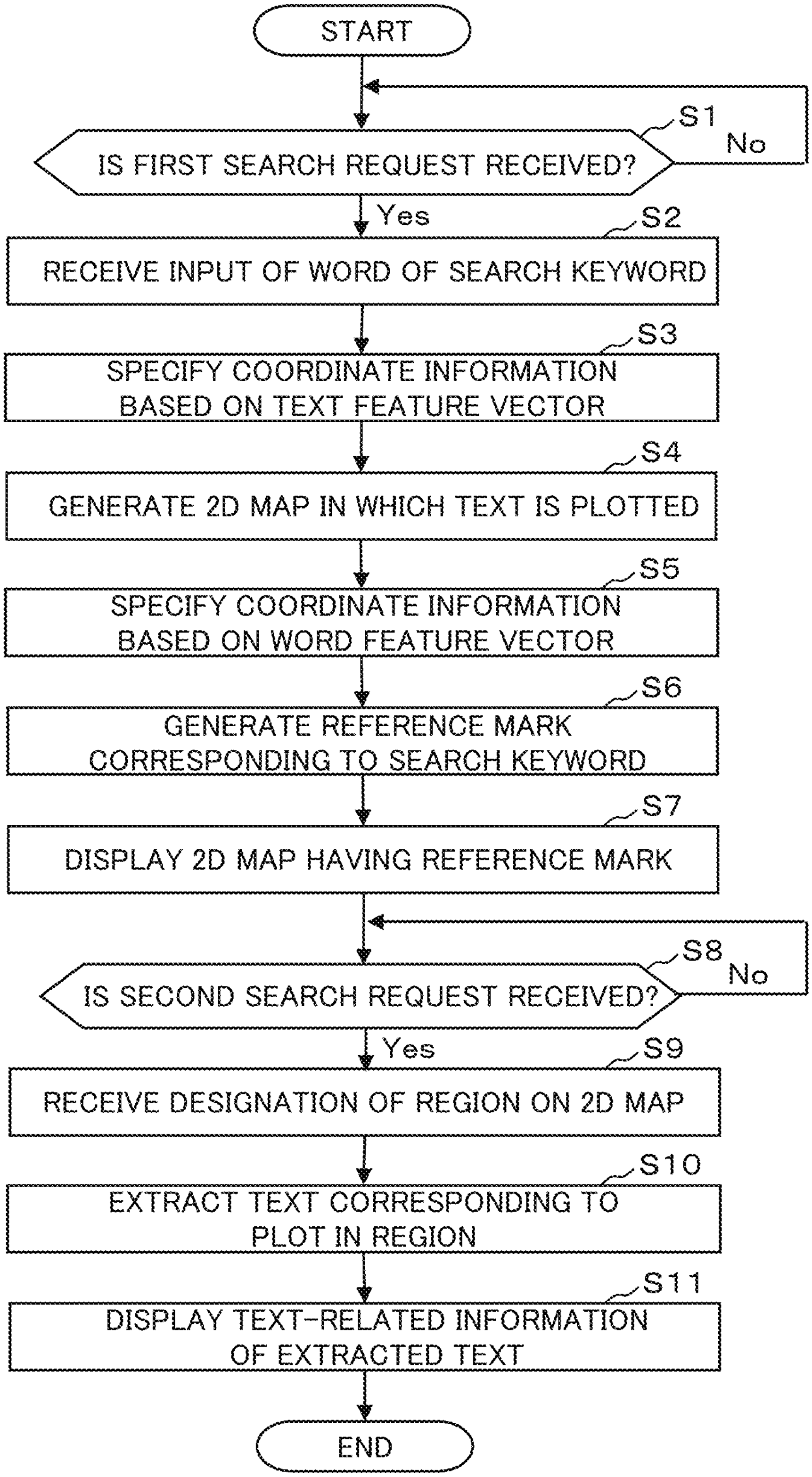
FIG. 8 is a flowchart illustrating an operation example of the server apparatus according to the first embodiment.

FIG. 8 is a flowchart illustrating an operation example of the server apparatus 10 according to the first embodiment configured as described above. First, the information input unit 11 determines whether or not the first search request transmitted from the first search request unit 22 of the client terminal 20 is received (step S1). When the first search request is received, the information input unit 11 accepts an input of a word included as a search keyword in the first search request (step S2).

Next, the 2D map generation unit 12 specifies coordinate information based on a plurality of text feature vectors having a predetermined relationship with a search keyword (a plurality of text feature vectors including a word which is a search keyword as an element) by referring to the first database of the first information DB storage unit 101 based on a word input by the information input unit 11 (step S3). Then, the 2D map generation unit 12 generates data of a 2D map in which a plurality of texts is plotted on a 2D plane based on the specified coordinate information (step S4).

Further, the reference mark display unit 13 specifies coordinate information based on a word feature vector corresponding to a word input as a search keyword by the information input unit 11 (step S5), and generates data of a reference mark to be synthesized and displayed at a corresponding position on a 2D map based on the specified coordinate information (step S6). Next, the 2D map generation unit 12 and the reference mark display unit 13 transmit data of the 2D map and data of the reference mark (which may be data obtained by synthesizing the data) to the client terminal 20, thereby causing the display apparatus 201 to display the 2D map together with the reference mark (step S7).

Next, the target information extraction unit 14 determines whether or not the second search request transmitted from the second search request unit 26 of the client terminal 20 is received (step S8). When the second search request is received, the target information extraction unit 14 accepts an input of information about a designated region included in the second search request (step S9). Then, the target information extraction unit 14 extracts text-related information of a text corresponding to a plot included in the designated region from the first information DB storage unit 101 (step S10), and transmits the extracted text-related information to the client terminal 20. The text-related information is displayed on the display apparatus 201 (step S11).

As described in detail above, in the first embodiment, in the server apparatus 10, by specifying coordinate information based on a plurality of text feature vectors having a relationship with a word which is a search keyword designated by a user operation in the client terminal 20, a 2D map in which a plurality of texts associated with the word which is the keyword are plotted on a 2D plane is generated and displayed on the client terminal 20. Further, the coordinate information based on the word feature vector corresponding to the word of the search keyword is specified, and the reference mark is displayed at the corresponding position on the 2D map indicated by the coordinate information. Then, by designating an arbitrary region based on a user operation on the 2D map displayed together with the reference mark, text-related information of a text corresponding to a plot included in the designated region is extracted and displayed on the client terminal 20.

According to the first embodiment configured in this way, a 2D map in which a reference mark is further placed at a corresponding position specified from an arbitrary input word is displayed rather than a 2D map in which only a plurality of texts is plotted on a 2D plane. The user can designate an arbitrary region in a 2D map in which a plot of each text as a search target is displayed together with a reference mark, thereby extracting text-related information corresponding to a plot included in the designated region.

In the way, the user can extract text-related information by designating a desired region on a 2D map with reference to a position of a reference mark corresponding to a word arbitrarily input as a search keyword. For example, it is possible to intentionally designate a region close to a reference mark (a region in which a plot of a text having a strong relationship with a word input as a search keyword is present), or dare to designate a region far from a reference mark (a region in which a plot of a text having a weak relationship with a word input as a search keyword is present). For this reason, according to the first embodiment, it is possible to facilitate the search intended by the user.

(First Modification in First Embodiment)

In the first embodiment, a description has been given of an example in which an arbitrary word designated by the client terminal 20 is used as a search keyword to specify a text feature vector having a relationship with the search keyword, thereby extracting some texts from a plurality of texts stored in the first information DB storage unit 101 to generate a 2D map. However, the invention is not limited thereto. For example, an arbitrary word designated by the client terminal 20 may be used only as information for specifying a display position of a reference mark, and a 2D map may be generated using all texts stored in the first information DB storage unit 101.

In this case, for example, when the information input unit 11 accepts an input of an arbitrary word from the client terminal 20, the 2D map generation unit 12 refers to a first database of the first information DB storage unit 101 to specify coordinate information based on a plurality of text feature vectors related to all texts stored in the first database, and generates a 2D map in which a plurality of texts is plotted on a 2D plane based on the specified coordinate information. An operation of the reference mark display unit 13 is similar to that of the first embodiment described above.

(Second Modification in First Embodiment)

In the first embodiment, a description has been given of an example in which a search target is a text and a relevant element is a word. However, on the contrary, a search target may be a word, and a relevant element may be a text including the word. In this case, search target feature vector=word feature vector, and relevant element feature vector=text feature vector. In addition, the first information database that stores information related to a plurality of search targets is a database that stores a plurality of words, a plurality of word feature vectors, and coordinate information corresponding thereto in association with each other, and the second information database that stores information related to a plurality of relevant elements is a database that stores a plurality of texts, a plurality of text feature vectors, and coordinate information corresponding thereto in association with each other. However, in the second modification, the second information DB storage unit 102 is unnecessary.

In this second modification, the 2D map generation unit 12 refers to the first information database of the first information DB storage unit 101 to generate a 2D map in which a plurality of words is plotted on a 2D plane based on coordinate information based on a plurality of word feature vectors (search target feature vectors) that characterizes each of a plurality of words, and displays the 2D map on the screen of the display apparatus 201 of the client terminal 20. For example, the 2D map generation unit 12 refers to the first information database of the first information DB storage unit 101 based on an arbitrary word input as a search keyword by the information input unit 11 to specify coordinate information based on a plurality of word feature vectors similar to a word feature vector (search target feature vector) corresponding to the search keyword, and generates a 2D map based on the specified coordinate information.

Here, a similarity between word feature vectors can be evaluated by various methods. For example, it is possible to apply a method of extracting a feature quantity of a word feature vector using a predetermined function and evaluating a similarity of the feature quantity. Alternatively, it is possible to use a Euclidean distance or cosine similarity between a word index value group of a word feature vector corresponding to a search keyword and a word index value group of a word feature vector stored in the first database, or use an edit distance.

Further, the reference mark display unit 13 refers to the first information database of the first information DB storage unit 101 based on an arbitrary word input as a search keyword by the information input unit 11 to specify coordinate information based on a word feature vector (search target feature vector) corresponding to the word input as the search keyword, and displays a predetermined reference mark at a corresponding position on a 2D map based on the specified coordinate information.

Second Embodiment

Next, a second embodiment of the invention will be described with reference to the drawings. As opposed to the first embodiment using a word (search keyword) as a search key, the second embodiment described below uses a text (search key text) as a search key. In the second embodiment, a search target is a text and a relevant element is a word. That is, search target feature vector=text feature vector, and relevant element feature vector=word feature vector.

An overall configuration of an information search system including an information search apparatus according to the second embodiment is similar to that of FIG. 1. However, in the second embodiment, a server apparatus 10' and a client terminal 20' are described to be distinguished from the first embodiment.

Figure 9:
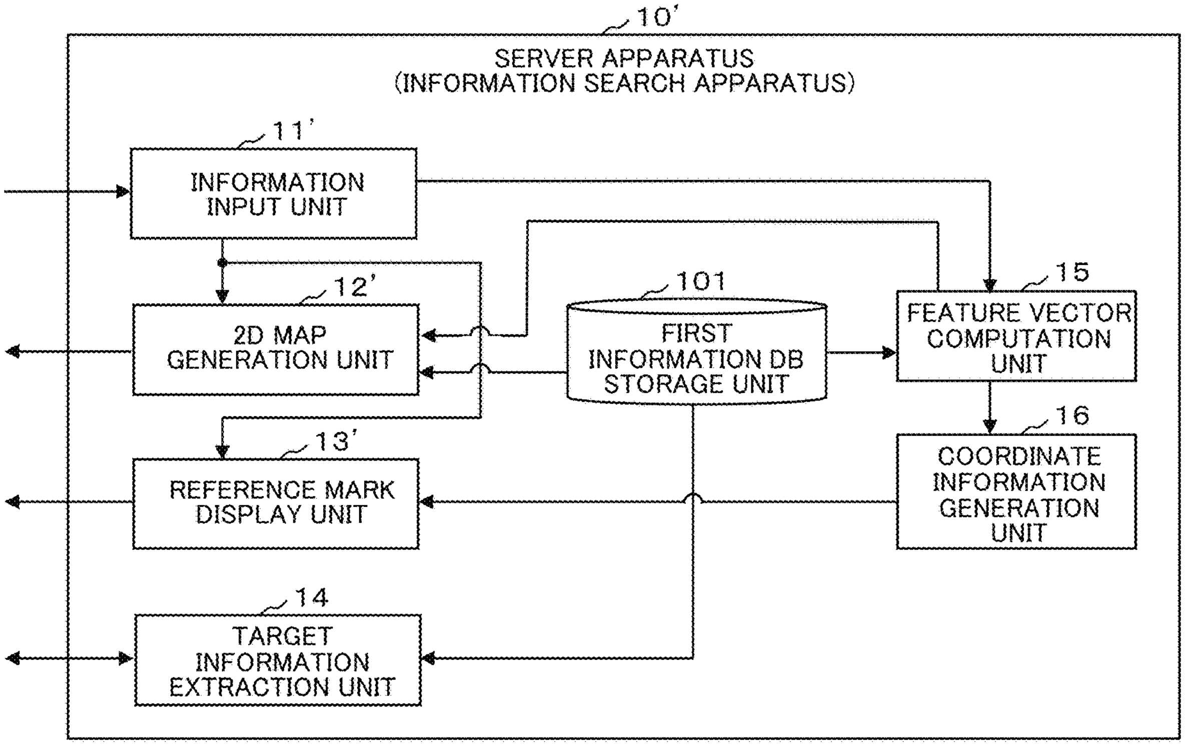
FIG. 9 is a block diagram illustrating a functional configuration example of a server apparatus (information search apparatus) according to a second embodiment.
Figure 10:
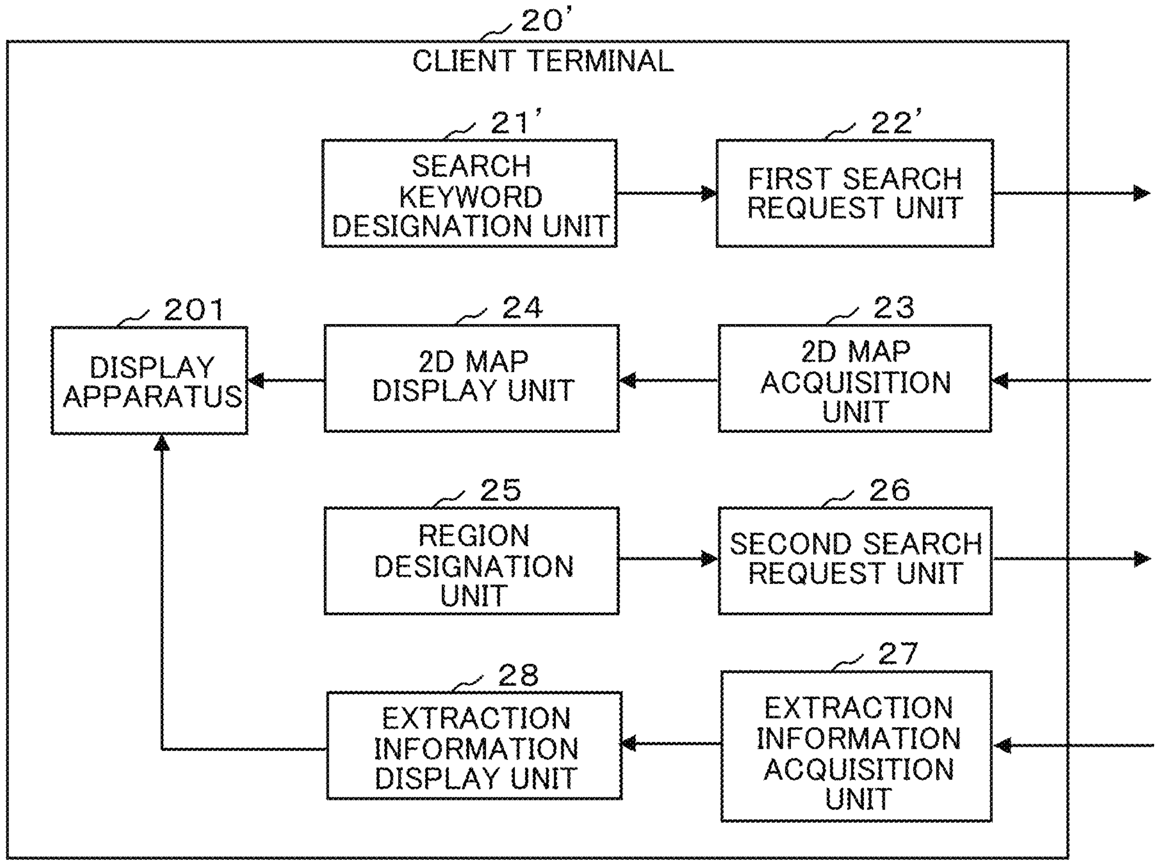
FIG. 10 is a block diagram illustrating a functional configuration example of a client terminal according to the second embodiment.

FIG. 9 is a block diagram illustrating a functional configuration example of the server apparatus 10' (information search apparatus) according to the second embodiment. FIG. 10 is a block diagram illustrating a functional configuration example of the client terminal 20' according to the second embodiment. In these FIGS. 9 and 10, those having the same reference symbols as that of those illustrated in FIGS. 2 and 3 have the same functions, and thus a duplicate description will be omitted here.

As illustrated in FIG. 9, the server apparatus 10' according to the second embodiment further includes a feature vector computation unit 15 and a coordinate information generation unit 16. Further, the server apparatus 10' according to the second embodiment includes an information input unit 11', a 2D map generation unit 12', and a reference mark display unit 13' instead of the information input unit 11, the 2D map generation unit 12, and the reference mark display unit 13. Further, the server apparatus 10' according to the second embodiment does not include the second information DB storage unit 102.

As illustrated in FIG. 10, the client terminal 20' according to the second embodiment includes a search key text designation unit 21' and a first search request unit 22' instead of the search keyword designation unit 21 and the first search request unit 22.

The feature vector computation unit 15 of the server apparatus 10' analyzes a plurality of search targets (texts) as information to be analyzed, and computes a search target feature vector (text feature vector). A configuration of the feature vector computation unit 15 is almost similar to the configuration of the feature vector computation unit 40 illustrated in FIG. 4, and corresponds to the one in which the word feature vector specification unit 45 is omitted.

The coordinate information generation unit 16 generates 2D coordinate information by performing a dimension compression process on a text feature vector computed by the feature vector computation unit 15. The coordinate information generation unit 16 performs a dimension compression process on m text feature vectors computed for m texts by the feature vector computation unit 15, thereby generating 2D coordinate information (however, in the case of q=2, the coordinate information generation unit 16 is unnecessary). For example, the coordinate information generation unit 16 performs a dimension compression process such as the PCA or the SVD on the index value matrix DW of m rows×n columns including respective n index values of m text feature vectors to dimensionally compress the matrix into a matrix of m rows×2 columns, and obtains values of the 2 columns as 2D coordinate information for each text feature vector.

The search key text designation unit 21' of the client terminal 20' designates an arbitrary search key text based on the user operation on the client terminal 20. For example, the user of the client terminal 20' operates a keyboard or a touch panel, and inputs a desired text, thereby designating a search key text. Alternatively, the search key text may be designated by copying and inputting text information related to an arbitrary text.

The first search request unit 22' transmits a first search request including a text designated by the search key text designation unit 21' as a search key to the server apparatus 10'.

The information input unit 11' of the server apparatus 10' receives the first search request transmitted from the first search request unit 22' of the client terminal 20', and accepts an input of a text included in the first search request (corresponding to arbitrary information related to a search target). That is, in the second embodiment, the information input unit 11' accepts an arbitrary text designated by the client terminal 20' as an input of arbitrary information.

A text input by the information input unit 11' may be a different text from a text stored in the first database of the first information DB storage unit 101. In this case, the text input by the information input unit 11', a text feature vector corresponding thereto, and coordinate information corresponding thereto are not stored in the first database. Therefore, in the second embodiment, processes of the feature vector computation unit 15 and the coordinate information generation unit 16 are performed using a text stored in the first information database (corresponding to an information database of the claims) of the first information DB storage unit 101 and an arbitrary text input by the information input unit 11', thereby generating a text feature vector corresponding to the input text and coordinate information corresponding thereto.

Incidentally, in the case that one arbitrary text input by the information input unit 11' is added to m texts stored in the first database to compute a text feature vector by the feature vector computation unit 15 and corresponding coordinate information is generated by the coordinate information generation unit 16, coordinate information stored in advance in the first database may be fixedly used without regenerating coordinate information related to m texts, and coordinate information related to one arbitrary text may be added and generated. In addition, when one text feature vector computed for an arbitrary text is dimensionally compressed, it is possible to perform dimension compression using a function having the same effect as when a dimension compression process is performed on m text feature vectors.

For example, when the PCA is used as the dimension compression process, information about a main component detected when the dimension compression process is performed on m feature vectors is stored in the first information DB storage unit 101, and the main component is taken over to perform the dimension compression process on one additional text feature vector. Further, when the SVD is used as the dimension compression process, information about a singular value detected when the dimension compression process is performed on m text feature vectors is stored in the first information DB storage unit 101, and this singular value is taken over to perform the dimension compression process on one additional text feature vector.

Specifically, the feature vector computation unit 15 executes the process as follows. That is, a word extraction unit 41 analyzes m+1 texts and extracts n words from the m+1 texts. A text vector computation unit 42A converts each of the m+1 texts into a q-dimensional vector according to a predetermined rule, thereby computing m+1 text vectors including q axis components. A word vector computation unit 42B converts each of the n words into a q-dimensional vector according to a predetermined rule, thereby computing n word vectors including q axis components.

An index value computation unit 43 takes each of the inner products of the m+1 text vectors and the n word vectors, thereby computing (m+1)×n index values reflecting a relationship between the m+1 texts and the n words. The text feature vector specification unit 44 specifies, as an additional text feature vector, a text index value group including index values of n words for one additional text.

The coordinate information generation unit 16 uses a function having the same effect as when the dimension compression process is performed on the text feature vector for each of the m texts to perform the dimension compression process on a text feature vector related to one additional text, thereby generating 2D coordinate information for one text. In this dimension compression, with regard to a text feature vector related to m texts, one stored in the first database of the first information DB storage unit 101 is fixedly used.

As described above, when one arbitrary text is to be analyzed in addition to m texts, coordinate information related to the m texts is fixed without being regenerated, and dimension compression is performed using a function having the same effect as when a dimension compression process is performed on m text feature vectors, so that coordinate information related to one text designated as a search key can be added and generated. In this way, not only texts having a high similarity of text feature vectors are merely plotted close to each other, but also implication of a region in which a cluster is formed based on coordinate information stored in the first database in advance can be clearly ensured.

Implication mentioned herein means that a cluster is formed between texts having a strong relationship. According to the above configuration, while maintaining a cluster formed when a 2D map is generated form texts, it is possible to generate a 2D map by adding one text designated as a search key, and it is possible to plot one additional text on a cluster having a strong relationship.

Note that for a text stored in the first database, a text feature vector may be recomputed by the feature vector computation unit 15, and coordinate information corresponding thereto may be generated by the coordinate information generation unit 16. In this case, the first information DB storage unit 101 is not required to store the text, the text feature vector, and the coordinate information in association with each other. That is, the information database stored in the first information DB storage unit 101 may simply store a plurality of texts as information to be analyzed.

For example, the 2D map generation unit 12' uses a text feature vector corresponding to a search key computed by the feature vector computation unit 15 to specify a plurality of text feature vectors similar to the text feature vector of the search key from the first database of the first information DB storage unit 101, and generates a 2D map based on coordinate information corresponding to the specified plurality of text feature vectors. That is, the 2D map generation unit 12' searches the first database fora text whose text feature vector is similar to that of a text input as a search key, and generates a 2D map based on coordinate information corresponding to a text feature vector extracted by this search.

The reference mark display unit 13' displays a predetermined reference mark at a corresponding position on the 2D map based on coordinate information based on the text feature vector of the search key generated by the coordinate information generation unit 16. As described above, in the second embodiment, the feature vector computation unit 15 computes a text feature vector that characterizes a search target (text) input by the information input unit 11', and the coordinate information generation unit 16 generates coordinate information based on the computed text feature vector, so that a reference mark is displayed at the corresponding position on the 2D map based on the coordinate information generated in this way.

According to the second embodiment configured as described above, by designating a text as a search key, a text whose text feature vector is similar to that of a text input as a search key is conceptually searched for, and it is possible to generate a 2D map in which a plurality of texts searched in this way is plotted on 2D coordinates. In addition, in this 2D map, a reference mark can be displayed at a position corresponding to coordinate information based on a text feature vector generated from a text input as a search key.

(First Modification in Second Embodiment)

In the second embodiment, a description has been given of an example in which an arbitrary text designated by the client terminal 20' is used as a search key text to specify a text feature vector having a relationship with the search key text (text feature vector similar to a text feature vector generated from the search key text), so that a 2D map is generated by extracting some texts from a plurality of texts stored in the first information DB storage unit 101. However, the invention is not limited thereto. For example, an arbitrary text designated by the client terminal 20' may be used only as information for specifying a display position of a reference mark, and a 2D map may be generated using all texts stored in the first information DB storage unit 101.

In this case, for example, when the information input unit 11' accepts an input of an arbitrary text from the client terminal 20', the 2D map generation unit 12' refers to the first database of the first information DB storage unit 101 to specify coordinate information based on a plurality of text feature vectors related to all texts stored in the first database, and generates a 2D map in which a plurality of texts is plotted on a 2D plane based on the specified coordinate information. An operation of the reference mark display unit 13' is similar to that of the second embodiment. That is, the reference mark display unit 13' displays a predetermined reference mark at a corresponding position on a 2D map based on coordinate information based on a text feature vector that characterizes an arbitrary text generated by the feature vector computation unit 15 and the coordinate information generation unit 16.

Alternatively, the 2D map generation unit 12' may specify each piece of coordinate information based on a plurality of text feature vectors generated by the feature vector computation unit 15 and the coordinate information generation unit 16 (a plurality of text feature vectors corresponding to a text stored in the first database and an arbitrary text input by the information input unit 11'), and generate a 2D map based on the specified coordinate information. In this case, the reference mark display unit 13' displays a predetermined reference mark at a corresponding position on a 2D map based on coordinate information based on a text feature vector that characterizes an arbitrary text generated by the feature vector computation unit 15 and the coordinate information generation unit 16.

(Second Modification in Second Embodiment)

In the second embodiment described above, a description has been given of an example in which a search target is a text and a relevant element is a word. However, on the contrary, a search target may be a word, and a relevant element may be a text including the word. In this case, search target feature vector=word feature vector, and relevant element feature vector=text feature vector. In addition, the first information database that stores information related to a plurality of search targets is a database that stores a plurality of words, a plurality of word feature vectors, and coordinate information corresponding thereto in association with each other, and the second information database that stores information related to a plurality of relevant elements is a database that stores a plurality of texts, a plurality of text feature vectors, and coordinate information corresponding thereto in association with each other.

In this second modification, a feature vector computation unit 15' including the word feature vector specification unit 45 is used instead of the feature vector computation unit 15. The feature vector computation unit 15' analyzes a plurality of texts stored as relevant elements in the second database of the second information DB storage unit 102 and an arbitrary text input as a search key by the information input unit 11' as information to be analyzed, and computes a text feature vector and a word feature vector. The coordinate information generation unit 16 generates 2D coordinate information by performing a dimension compression process on the text feature vector and the word feature vector computed by the feature vector computation unit 15.

The 2D map generation unit 12' generates a 2D map in which a plurality of words is plotted on 2D coordinates based on coordinate information based on a word feature vector (search target feature vector) computed by the feature vector computation unit 15' and the coordinate information generation unit 16. In addition, the reference mark display unit 13' displays a predetermined reference mark at a corresponding position on a 2D map based on coordinate information based on a text feature vector (relevant element feature vector) of a search key computed by the feature vector computation unit 15' and the coordinate information generation unit 16.

Note that the 2D map generation unit 12' may generate a 2D map in which a plurality of words is plotted on a 2D plane based on coordinate information based on a plurality of word feature vectors characterizing each of a plurality of words stored in the first information DB storage unit 101, and the reference mark display unit 13' may display a predetermined reference mark at a corresponding position on a 2D map based on coordinate information based on a text feature vector computed by the feature vector computation unit 15 and the coordinate information generation unit 16 for an arbitrary text input, not as a search key.

Further, the 2D map generation unit 12' may generate a 2D map by conceptually searching for a word, which is a search target, using an arbitrary text input by the information input unit 11' as a search key. For example, the 2D map generation unit 12' specifies a text feature vector (relevant element feature vector) corresponding to a text, which is a search key, by referring to the second information database of the second information DB storage unit 102 based on an arbitrary text input as a search key by the information input unit 11'. Furthermore, the 2D map generation unit 12' specifies a plurality of word feature vectors (search target feature vectors) having a relationship with a text feature vector by referring to the first information database of the first information DB storage unit 101 based on a word which is an element included in the specified text feature vector. For example, a word feature vector corresponding to a plurality of words included in the text feature vector is specified. A word feature vector similar to the word feature vector may be further specified. Then, the 2D map generation unit 12' generates a 2D map based on coordinate information based on a plurality of word feature vectors specified in this way.

In this example, the reference mark display unit 13' refers to the second information database of the second information DB storage unit 102 based on an arbitrary text input as a search key by the information input unit 11' to specify a text feature vector (relevant element feature vector) corresponding to a text, which is a search key, and displays a predetermined reference mark at a corresponding position on a 2D map based on coordinate information based on the specified text feature vector.

(Third Modification in Second Embodiment)

In addition, in the second embodiment, a description has been given of an example in which an index value computed by the index value computation unit 43 is used to specify a text feature vector by the text feature vector specification unit 44, and a word feature vector is specified by the word feature vector specification unit 45. However, the invention is not limited thereto. For example, a text vector computed by the text vector computation unit 42A may be specified as a text feature vector, and a word vector computed by the word vector computation unit 42B may be specified as a word feature vector.

(Fourth Modification in Second Embodiment)

In addition, in the second embodiment, a description has been given of an example in which considering that a text input by the information input unit 11' may not be stored in the first database of the first information DB storage unit 101, a text stored in the first information database and an arbitrary text input by the information input unit 11' are used to perform processes of the feature vector computation unit 15 and the coordinate information generation unit 16, thereby generating a text feature vector corresponding to the input text and coordinate information corresponding thereto. However, the invention is not limited thereto.

For example, when a text stored in the first database is designated as a search key, the following process may be performed. That is, the 2D map generation unit 12' refers to the first information database based on an arbitrary text input as a search key by the information input unit 11' to specify a text feature vector corresponding to the search key, and generates a 2D map based on coordinate information based on a plurality of text feature vectors similar thereto. The reference mark display unit 13' refers to the first information database to specify coordinate information based on a text feature vector corresponding to a text input as a search key, and displays a predetermined reference mark at a corresponding position on a 2D map based on the specified coordinate information.

Note that the reference mark display unit 13' may perform processes of the feature vector computation unit 15 and the coordinate information generation unit 16 using a text stored in the first information database and an arbitrary text input as a search key by the information input unit 11' to specify coordinate information based on a text feature vector corresponding to the arbitrary text input as a search key, and display a predetermined reference mark at a corresponding position on a 2D map based on the specified coordinate information.

In the first and second embodiments, a description has been given of an example in which an information search apparatus is applied to the server apparatus 110 or 10' in the information search system including the server apparatus 110 or 10' and the client terminal 20 or 20'. However, the invention is not limited thereto. For example, the information search apparatus according to the first embodiment or the second embodiment may be applied to a stand-alone personal computer, etc.

In addition, in the first and second embodiments, a description has been given of an example in which a combination of a text and a word is used as a search target and a relevant element. However, the invention is not limited thereto. It is possible to apply the first embodiment and the second embodiment to a combination of two types of information related to each other.

In addition, each of the first and second embodiments is merely an example of embodiment in carrying out the invention, and the technical scope of the invention should not be interpreted in a limited manner by these embodiments. That is, the invention can be implemented in various forms without departing from a gist or a main feature thereof.

REFERENCE SIGNS LIST

10, 10' Server apparatus (information search apparatus)
11, 11' Information input unit
12, 12' 2D map generation unit
13, 13' Reference mark display unit
14 Target information extraction unit
15 Feature vector computation unit
16 Coordinate information generation unit
40 Feature vector computation apparatus
41 Word extraction unit
42 Vector computation unit
42A Text vector computation unit
42B Word vector computation unit
43 Index value computation unit
44 Text feature vector specification unit
45 Word feature vector specification unit
101 First information DB storage unit
102 Second information DB storage unit

The invention claimed is:

1. An information search apparatus, for displaying a 2D map in which a plurality of points corresponding to a plurality of search targets is plotted at coordinate positions on a 2D plane each of which is specified from the plurality of search targets and extracting a search target corresponding to a point included in a region designated by a user operation on the 2D map, apparatus characterized in that the search target is a text, and the relevant element of the search target is a word included in the text, the information search apparatus further includes:

an information input unit that accepts an input of an arbitrary text as arbitrary information related to the search target;

a first information database in which a plurality of texts, a plurality of text feature vectors characterizing each of the plurality of texts, and coordinate information corresponding thereto are stored in association with each other;

a feature vector computation unit that analyzes the plurality of texts stored in the first information database and the arbitrary text input by the information input unit and computes a text feature vector characterizing the arbitrary text;

a coordinate information generation unit that generates 2D coordinate information by performing a dimension compression process on the text feature vector computed by the feature vector computation unit;

a 2D map generation unit that refers to the coordinate information stored in the first information database to generate a 2D map in which a plurality of points corresponding to the plurality of texts are plotted at corresponding positions on a 2D plane, and displays the 2D map on a screen;

a reference mark display unit that displays a predetermined reference mark consisting of a point in a display manner different from the plurality of points, at a corresponding position predetermined on the 2D map based on the coordinate information generated by performing the same dimension compression process as that performed on the text feature vectors stored in the first information database, on a specific text feature vector associated with the reference mark, which is the text feature vector related to the arbitrary text input by the information input unit; and a target information extraction unit that extracts a search target corresponding to at least one point included in an arbitrary region designated by a user operation on the 2D map displayed together with the plurality of points and the reference mark on the screen, and wherein the 2D map is generated by fixedly using the coordinate information on the plurality of points which is stored in advance in the first information database, while the predetermined reference mark in a display manner different from the plurality of points is displayed by using the coordinate information on the point different from the plurality of points which is generated with respect to the arbitrary text by processing of the feature vector computation unit and the coordinate information generation unit for the plurality of texts stored in advance in the first information database and the arbitrary text input by the information input unit.

2. The information search apparatus according to claim 1, characterized in that when the text feature vector computed by the feature vector computation unit for the arbitrary text is dimensionally compressed, the coordinate information generation unit performs dimension compression using a function having the same effect as when a dimension compression process had performed on the plurality of text feature vectors when generating in advance the coordinate information stored in the first information database.

3. The information search apparatus according to claim 2, characterized in that when the text feature vector computed by the feature vector computation unit for the arbitrary text is dimensionally compressed, the coordinate information generation unit performs dimension compression using the feature information detected when a dimension compression process had performed on the plurality of text feature vectors when generating in advance the coordinate information stored in the first information database.

4. An information search apparatus, for displaying a 2D map in which a plurality of points corresponding to a plurality of search targets is plotted at coordinate positions on a 2D plane each of which is specified from the plurality of search targets and extracting a search target corresponding to a point included in a region designated by a user operation on the 2D map, apparatus characterized in that the search target is a word, and the relevant element of the search target is a text including the word, the information search apparatus further includes:

an information input unit that accepts an input of an arbitrary word as arbitrary information related to the search target;

a first information database, in which a plurality of words, a plurality of word feature vectors characterizing each of the plurality of words, and coordinate information corresponding thereto are stored in association with each other;

a feature vector computation unit that analyzes the plurality of words stored in the first information database and the arbitrary word input by the information input unit and computes a word feature vector characterizing the arbitrary word;

a coordinate information generation unit that generates 2D coordinate information by performing a dimension compression process on the word feature vector computed by the feature vector computation unit;

a 2D map generation unit that refers to the coordinate information stored in the first information database to generate a 2D map in which a plurality of points corresponding to the plurality of words are plotted at corresponding positions on a 2D plane, and displays the 2D map on a screen;

a reference mark display unit that displays a predetermined reference mark consisting of a point in a display manner different from the plurality of points, at a corresponding position predetermined on the 2D map based on the coordinate information generated by performing the same dimension compression process as that performed on the word feature vectors stored in the first information database, on a specific word feature vector associated with the reference mark, which is the word feature vector related to the arbitrary word input by the information input unit; and a target information extraction unit that extracts a search target corresponding to at least one point included in an arbitrary region designated by a user operation on the 2D map displayed together with the plurality of points and the reference mark on the screen, and wherein the 2D map is generated by fixedly using the coordinate information on the plurality of points which is stored in advance in the first information database, while the predetermined reference mark in a display manner different from the plurality of points is displayed by using the coordinate information on the point different from the plurality of points which is generated with respect to the arbitrary word by processing of the feature vector computation unit and the coordinate information generation unit for the plurality of words stored in advance in the first information database and the arbitrary word input by the information input unit.

5. The information search apparatus according to claim 1, characterized in that the information input unit accepts an input of the arbitrary text as a search key, the 2D map generation unit refers to the first information database based on an arbitrary text input as a search key by the information input unit to specify coordinate information based on a plurality of text feature vectors similar to the text feature vector corresponding to the search key, and generates the 2D map in which a plurality of points corresponding to the plurality of texts is plotted at respective positions on the 2D plane based on the specified plurality of pieces of coordinate information, and the reference mark display unit displays the predetermined reference mark at a corresponding position on the 2D map based on the coordinate information generated by the coordinate information generation unit for the arbitrary text input as the search key.

6. The information search apparatus according to claim 1, characterized in that the information input unit accepts an input of the arbitrary text as a search key, the 2D map generation unit uses the text feature vector corresponding to a search key computed by the feature vector computation unit based on an arbitrary text input as the search key by the information input unit to specify, from the first information database, coordinate information based on a plurality of text feature vectors similar to the computed text feature vector, and generates the 2D map in which the plurality of points is plotted at respective positions on the 2D plane based on the specified plurality of pieces of coordinate information, and the reference mark display unit displays the predetermined reference mark at a corresponding position on the 2D map based on the coordinate information generated by the coordinate information generation unit for the arbitrary text input as the search key.

7. The information search apparatus according to claim 4, characterized in that the information input unit accepts an input of the arbitrary word as a search key, the 2D map generation unit refers to the first information database based on the arbitrary word input as the search key by the information input unit, thereby specifies coordinate information based on a plurality of word feature vectors similar to a word feature vector corresponding to the search key, and generates the 2D map in which a plurality of points corresponding to the plurality of words is plotted at respective positions on the 2D plane based on the specified plurality of pieces of coordinate information, and the reference mark display unit displays the predetermined reference mark at a corresponding position on the 2D map based on the coordinate information generated by the coordinate information generation unit for the arbitrary word input as the search key.

8. The information search apparatus according to claim 1 characterized in that the feature vector computation unit includes a word extraction unit that analyzes m texts, wherein m is an arbitrary integer of 2 or more, stored in the first information database and one arbitrary text input by the information input unit and extracts n words, wherein n is an arbitrary integer of 2 or more, from (m+1) texts, a text vector computation unit that converts each of the (m+1) texts into a q-dimensional vector, wherein q is an arbitrary integer of 2 or more according to a predetermined rule, thereby computing (m+1) text vectors including q axis components, a word vector computation unit that converts each of the n words into a q-dimensional vector according to a predetermined rule, thereby computing n word vectors including q axis components, an index value computation unit that obtains each of inner products of the (m+1) text vectors and the n word vectors, thereby computing (m+1)×n index values reflecting a relationship between the (m+1) texts and the n words, and a text feature vector specification unit that specifies, as the text feature vector, a text index value group including index values of n words for the one text input by the information input unit.

9. An information search method for displaying a 2D map in which a plurality of points corresponding to a plurality of search targets is plotted at coordinate positions on a 2D plane each of which is specified from the plurality of search targets and extracting a search target corresponding to a point included in a region designated by a user operation on the 2D map, characterized in that by:

the search target is a text and a word included in the text is a relevant element of the search target, the information search method comprising:

a step of accepting, by an information input unit of an information search apparatus, an input of an arbitrary text as arbitrary information related to the search target;

a step of analyzing, by a feature vector computation unit of an information search apparatus, the plurality of texts stored in the first information database, in which a plurality of texts, a plurality of text feature vectors characterizing each of the plurality of texts, and coordinate information corresponding thereto are stored in association with each other, and the arbitrary text input by the information input unit and computes a text feature vector characterizing the arbitrary text;

a step of generating, by a coordinate information generation unit of the information search apparatus, 2D coordinate information by performing a dimension compression process on the text feature vector computed by the feature vector computation unit;

a step of generating, by a 2D map generation unit of the information search apparatus, a 2D map in which a plurality of points corresponding to the plurality of search targets are plotted at corresponding positions on a 2D plane by referring to coordinate information stored in the first information database, and displaying the 2D map on a screen;

a step of displaying, by a reference mark display unit of the information search apparatus, a predetermined reference mark consisting of a point in a display manner different from the plurality of points, at a corresponding position predetermined on the 2D plane based on the coordinate information by performing the same dimension compression process as that performed on the text feature vectors stored in the first information database, on a specific text feature vector associated with the reference mark, which is the text feature vector related to the arbitrary text input by the information input unit; and a step of extracting, by a target information extraction unit of the information search apparatus, a search target corresponding to at least one point included in an arbitrary region designated by a user operation on the 2D map displayed together with the plurality of points and the reference mark on the screen, wherein generating the 2D map is by fixedly using the coordinate information on the plurality of points which is stored in advance in the first information database, while displaying the predetermined reference mark in a display manner different from the plurality of points using the coordinate information on the point different from the plurality of points which is generated with respect to the arbitrary text by processing of the feature vector computation unit and the coordinate information generation unit for the plurality of texts stored in advance in the first information database and the arbitrary text input by the information input unit.

10. The information search apparatus according to claim 9 characterized in that the feature vector computation unit includes a word extraction unit that analyzes m texts, wherein m is an arbitrary integer of 2 or more, stored in the first information database and one arbitrary text input by the information input unit and extracts n words, wherein n is an arbitrary integer of 2 or more, from (m+1) texts, a text vector computation unit that converts each of the (m+1) texts into a q-dimensional vector, wherein q is an arbitrary integer of 2 or more according to a predetermined rule, thereby computing (m+1) text vectors including q axis components, a word vector computation unit that converts each of the n words into a q-dimensional vector according to a predetermined rule, thereby computing n word vectors including q axis components, an index value computation unit that obtains each of inner products of the (m+1) text vectors and the n word vectors, thereby computing (m+1)×n index values reflecting a relationship between the (m+1) texts and the n words, and a text feature vector specification unit that specifies, as the text feature vector, a text index value group including index values of n words for the one text input by the information input unit.

11. The information search apparatus according to claim 4 characterized in that the feature vector computation unit includes a word extraction unit that analyzes m texts, wherein m is an arbitrary integer of 2 or more, stored in the first information database and one arbitrary text input by the information input unit and extracts n words, wherein n is an arbitrary integer of 2 or more, from (m+1) texts, a text vector computation unit that converts each of the (m+1) texts into a q-dimensional vector, wherein q is an arbitrary integer of 2 or more according to a predetermined rule, thereby computing (m+1) text vectors including q axis components, a word vector computation unit that converts each of the n words into a q-dimensional vector according to a predetermined rule, thereby computing n word vectors including q axis components, an index value computation unit that obtains each of inner products of the (m+1) text vectors and the n word vectors, thereby computing (m+1)×n index values reflecting a relationship between the (m+1) texts and the n words, and a text feature vector specification unit that specifies, as the text feature vector, a text index value group including index values of n words for the one text input by the information input unit.

* * * * *